United States Patent [19]

Harper et al.

[11] Patent Number: 4,680,811

[45] Date of Patent: Jul. 14, 1987

[54] VEHICLE TO FIXED STATION INFRARED COMMUNICATIONS LINK

[75] Inventors: James G. Harper; Louis G. Bailey, both of Dallas; Robert B. McJohnson, Pilot Point; Ganesh Rajagopal, Richardson; Don R. Walker, Coppell, all of Tex.

[73] Assignee: Veeco Integrated Automation Inc., Dallas, Tex.

[21] Appl. No.: 681,113

[22] Filed: Dec. 13, 1984

[51] Int. Cl.$^4$ .............................................. H04B 9/00
[52] U.S. Cl. ...................... 455/617; 180/167; 455/603; 901/1
[58] Field of Search ............... 455/606, 607, 608, 617, 455/618, 603; 180/167, 168, 169; 414/909; 901/1, 47; 362/249; 250/239

[56] References Cited

U.S. PATENT DOCUMENTS

| 3,406,481 | 10/1968 | Tachi | 455/603 |
|---|---|---|---|
| 4,150,284 | 4/1979 | Trenkler et al. | 455/608 |
| 4,236,255 | 11/1980 | Burgener et al. | 455/603 |
| 4,328,545 | 5/1982 | Halsall et al. | 180/167 |
| 4,402,090 | 8/1983 | Gfeller et al. | 455/607 |

FOREIGN PATENT DOCUMENTS

| 2823931 | 12/1979 | Fed. Rep. of Germany | 455/606 |
|---|---|---|---|
| 59-85150 | 5/1984 | Japan | 455/607 |
| 59-105731 | 6/1984 | Japan | 455/607 |
| 59-122141 | 7/1984 | Japan | 455/607 |

OTHER PUBLICATIONS

Gupton-"Nuclear Power Plant"-Robotics Age-Mar.-/Apr. 1983, pp. 18-21.
Sato et al.-A New Optical Communication System-IEEE Trans. on Cable TV, vol. CATV-4, No. 1, Jan. 1979, pp. 1-9.

Primary Examiner—Joseph A. Orsino, Jr.
Attorney, Agent, or Firm—Morgan & Finnegan

[57] ABSTRACT

In an infrared communications link, a transmitter is connected to a plurality of infrared light emitting diodes disposed about an arcuate surface to illuminate a generally rectangular area with pulsed optical energy. When a receiver having a plurality of photodiodes is disposed within the generally rectangular area the information contained in the pulsed optical energy is recovered. The combination of the transmitter and receiver provide a transceiver that is ideally suited for providing two way communication between a fixed station and an automatically guided vehicle in an electromagnetically hostile environment such as a highly automated factory.

14 Claims, 8 Drawing Figures

VEHICLE TO FIXED STATION INFRARED COMMUNICATIONS LINK

BACKGROUND OF THE INVENTION

1. Field of the Invention

The present invention relates generally to communications links and more specifically relates to a communication link in which pulsed data is transmitted in the form of infrared radiation between a fixed station and an automatically guided vehicle.

2. Description of the Prior Art

Automatically guided vehicles are well-known in the art and one type is generally described in U.S. Pat. Nos. 3,935,922, 3,970,840, 4,003,445, 4,020,918, 4,034,823, 4,307,791, 4,341,985, 4,379,497 and 4,397,372. These patents disclose an automatically guided vehicle which follows a guide line that contains material that emits electromagnetic radiation. The electromagnetic radiation can be detected by a photocell sensor. The automatically guided vehicle is also controlled by a radio frequency communication link.

These automatically guided vehicles controlled by radio frequency signals are used in warehouses and for "on command" travel from place to place in a factory for parts delivery. The radio frequency signals are serial in nature, slow in the amount of information transmitted, and may be subjected to electromagnetic interference from other equipment used in the factory environment. Typically the radio frequency signals are used for vehicle navigation, guidance and collision avoidance.

It can be appreciated, therefore, that in a highly automated factory the communications link for these vehicles possess inherent shortcomings. Accordingly, there is a need for a communication link which is not susceptible to electromagnetic interference and which can transmit the large amounts of data associated with automated devices.

SUMMARY OF THE INVENTION

The apparatus of the present invention provides an infrared communications link which is not susceptible to electromagnetic intereference and which can transmit a large amount of data. The infrared communications link is ideally suited for transmitting data between a fixed station and an automatically guided vehicle in an electromagnetically hostile environment. Preferably, both the fixed station and the automatically guided vehicle include a transceiver that enables two way communication between the two locations. The transceiver includes a transmitter which encodes a signal into pulsed data. The pulsed data is applied to an infrared source which is comprised of a plurality of infrared light emitting diodes that are disposed in a predetermined arc to illuminate a desired area. The pulsed optical energy of the infrared light source is detected by an infrared detector at the other location which is disposed within the desired area. A receiver that is responsive to the infrared detector recovers the pulsed data from the pulsed optical energy. The transceivers may be ganged together to form a network that enables the automatically guided vehicle to operate over a relatively large area.

DETAILED DESCRIPTION OF THE INVENTION

Figure 1:
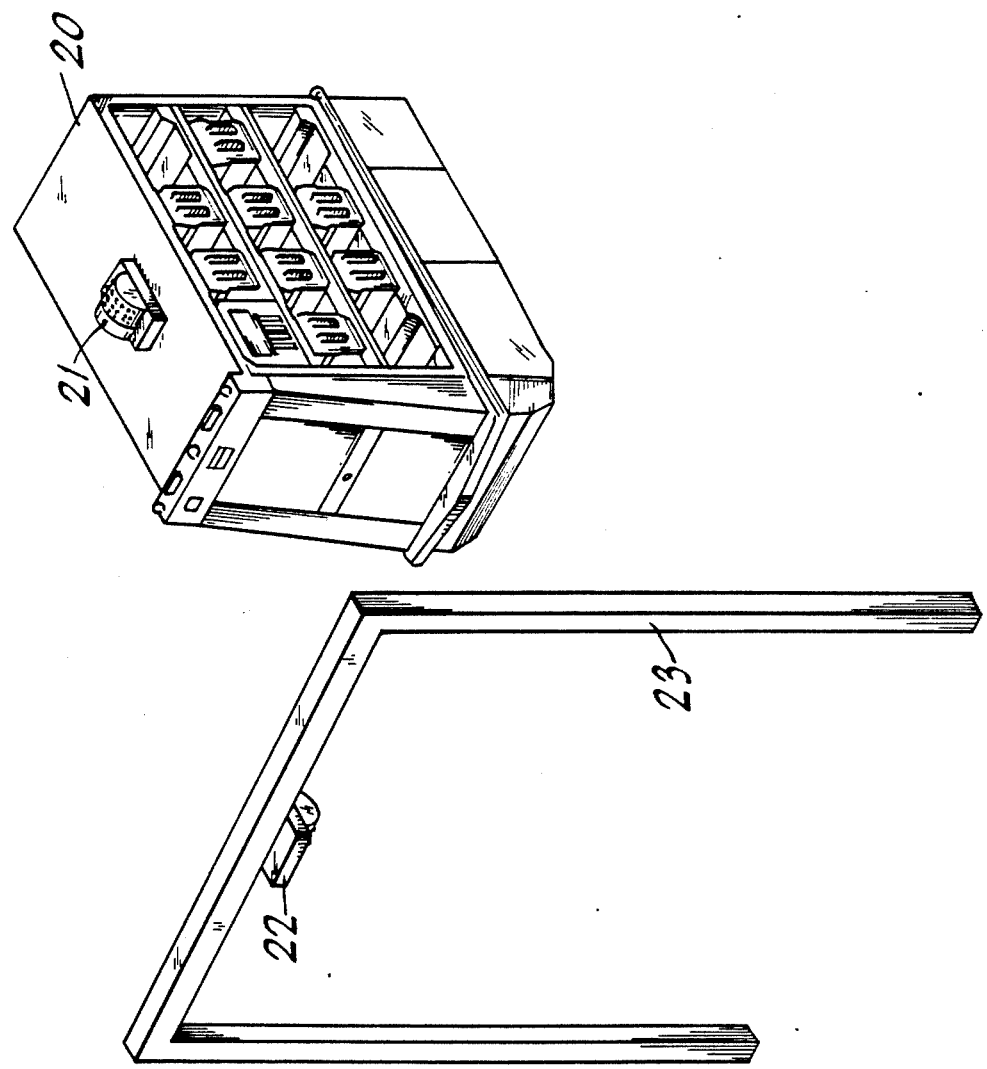
FIG. 1 is an illustration of an automatically guided vehicle and a pod containing an infrared light source.

Referring now to FIG. 1, an automatically guided vehicle 20 having an infrared transceiver 21 is illustrated in close proximity to an infrared transceiver 22. The infrared transceivers 21, 22 permit two-way communication between the automatically guided vehicle 20 and a fixed station. The infrared transceiver 22 is illustrated as being mounted on a support 23, but it could be mounted on the ceiling, a pole or even a piece of equipment. A plurality of infrared transceivers 22 can be ganged together to form a network for the automatically guided vehicle 20.

The infrared transceivers 21, 22 enable the automatically guided vehicle 20 to be used in an electromagnetically hostile environment such as a highly automated manufacturing facility for semiconductors. In a highly automated manufacturing facility, there is a substantial amount of electromagnetic noise that is generated by the equipment. Since the communications link of the present invention utilizes infrared radiation, it is less susceptible to the electromagnetic noise.

Figure 3:
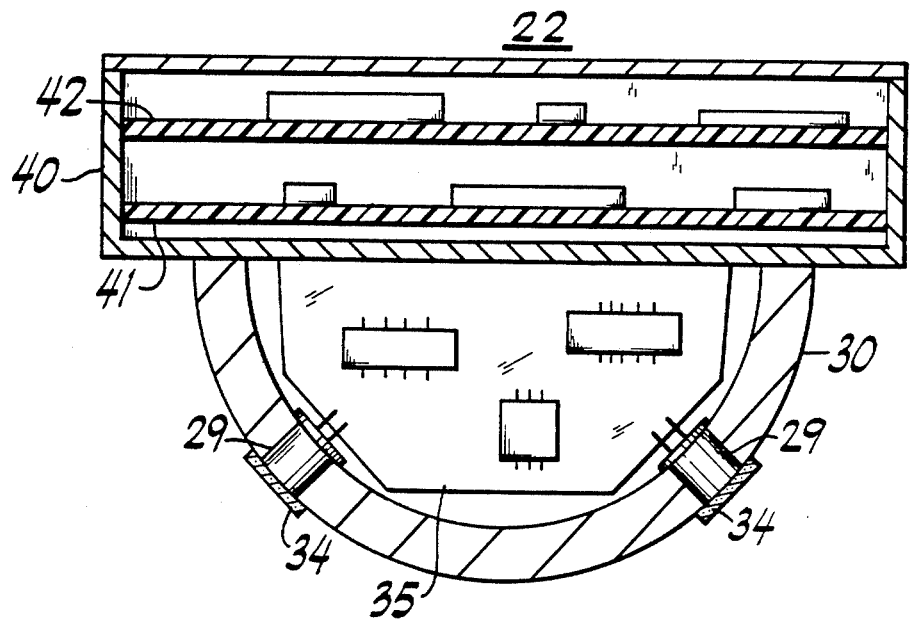
FIG. 3 is a cross sectional view of the pod of FIG. 1.
Figure 4:
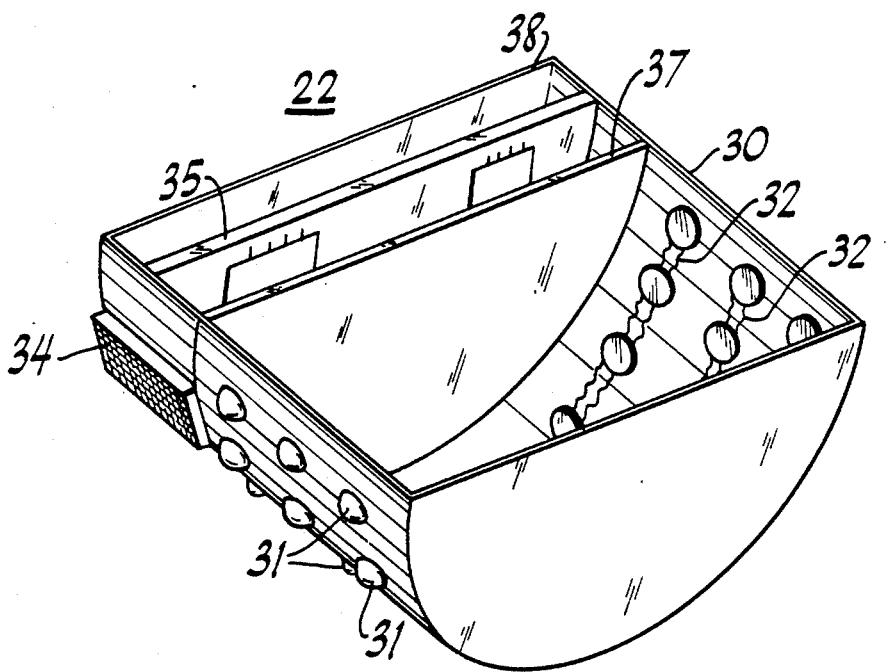
FIG. 4 is a partial perspective view of the pod containing the infrared light source.

Referring now to FIGS. 3 and 4 the infrared transceiver 22 is illustrated in cross section and in partial perspective. The infrared transceiver 22 includes a generally half cylindrical pod 30 having a transmitter portion that includes a plurality of infrared light emitting diodes (IR LED's) 31 disposed about its outer arcuate surface. The IR LED's 31 are connected by wires 32. The half cylindrical pod 30 also includes a receiver portion having a pair of photodiodes 29 which are covered by visible light filters 34. Preferably, the photodiodes 29 are disposed at a 45 degree angle within the half cylindrical pod 30. A printed circuit board 35 that includes receiver amplifier electronics for the photodiodes 29 is mounted within the half cylindrical pod 30. The receiver amplifier printed circuit board 35 is preferably placed close to the photodiodes 29 to reduce noise pickup. The receiver amplifier printed circuit board 35 is also shielded from electromagnetic interference by an aluminum divider 37 and an aluminum foil covered rear panel 38. Disposed above the half cylindrical pod 30 is an aluminum box 40 having a printed circuit board 41 for the receiver electronics and a printed circuit board 42 for the transmitter electronics.

Figure 5:
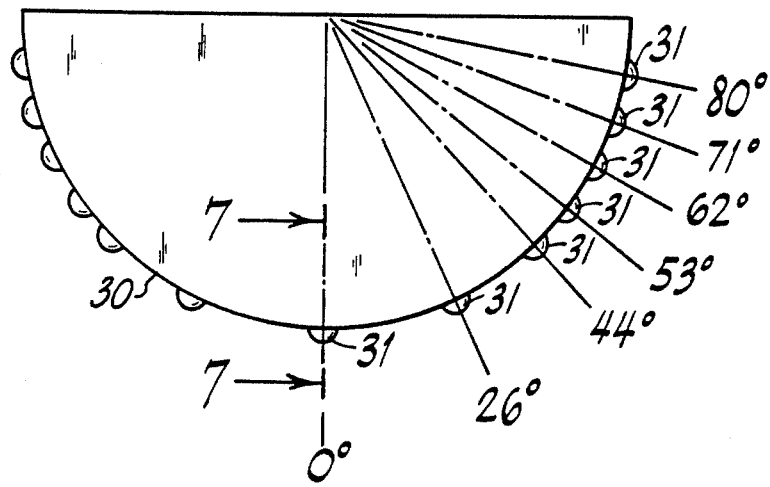
FIG. 5 is a side view of the pod.
Figure 6:
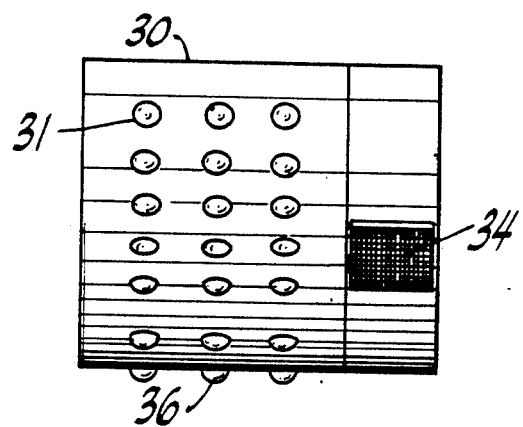
FIG. 6 is an end view of the pod.

Referring now to FIGS. 5 and 6, the positioning of the IR LED's 31 within the half cylindrical pod 30 is illustrated. The IR LED's 31 are preferably disposed about the arcuate surface of the half cylindrical pod 30 in rows of three at angles of 0°, 26°, 44°, 53°, 62°, 71° and 80°. In the row of IR LED's 31 disposed at 0° degrees, there is a visible light red LED 36 that is used to indicate that the system is "on".

Figure 7:
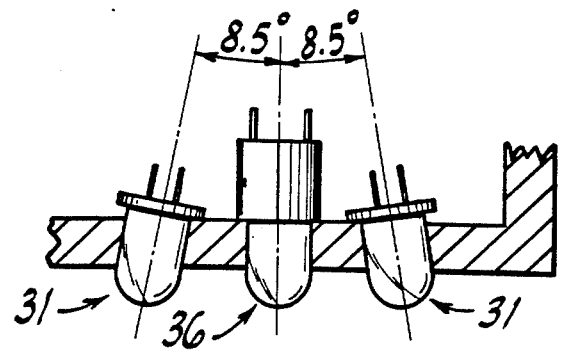
FIG. 7 is a cross sectional view taken along line 7—7 of FIG. 5.

Referring now to FIG. 7, a cross section taken along line 7—7 of FIG. 5 illustrates the IR LED's 31 and the red LED 36 disposed at 0° on the half cylindrical pod 30. The IR LED's 31 at 0° preferably have a half cone angle of 15° and the two outside IR LED's 31 are tilted at an 8.5° angle with respect to a radial line. The two outside IR LED's 31 at 26° preferably have a half cone angle of 6°, the center IR LED 31 has a half cone angle of 15°; and the two outside IR LED's 31 are tilted at an angle of 8.5° with respect to a radial line. The IR LED's 31 are disposed at 44°, 53°, 62°, 71° and 80° preferably all have half cone angles of 6° and the two outside IR LED's 31 tilted respectively at angles of 6.5°, 5°, 3.5°, 2.5°, and 0° with respect to a radial line.

Figure 2:
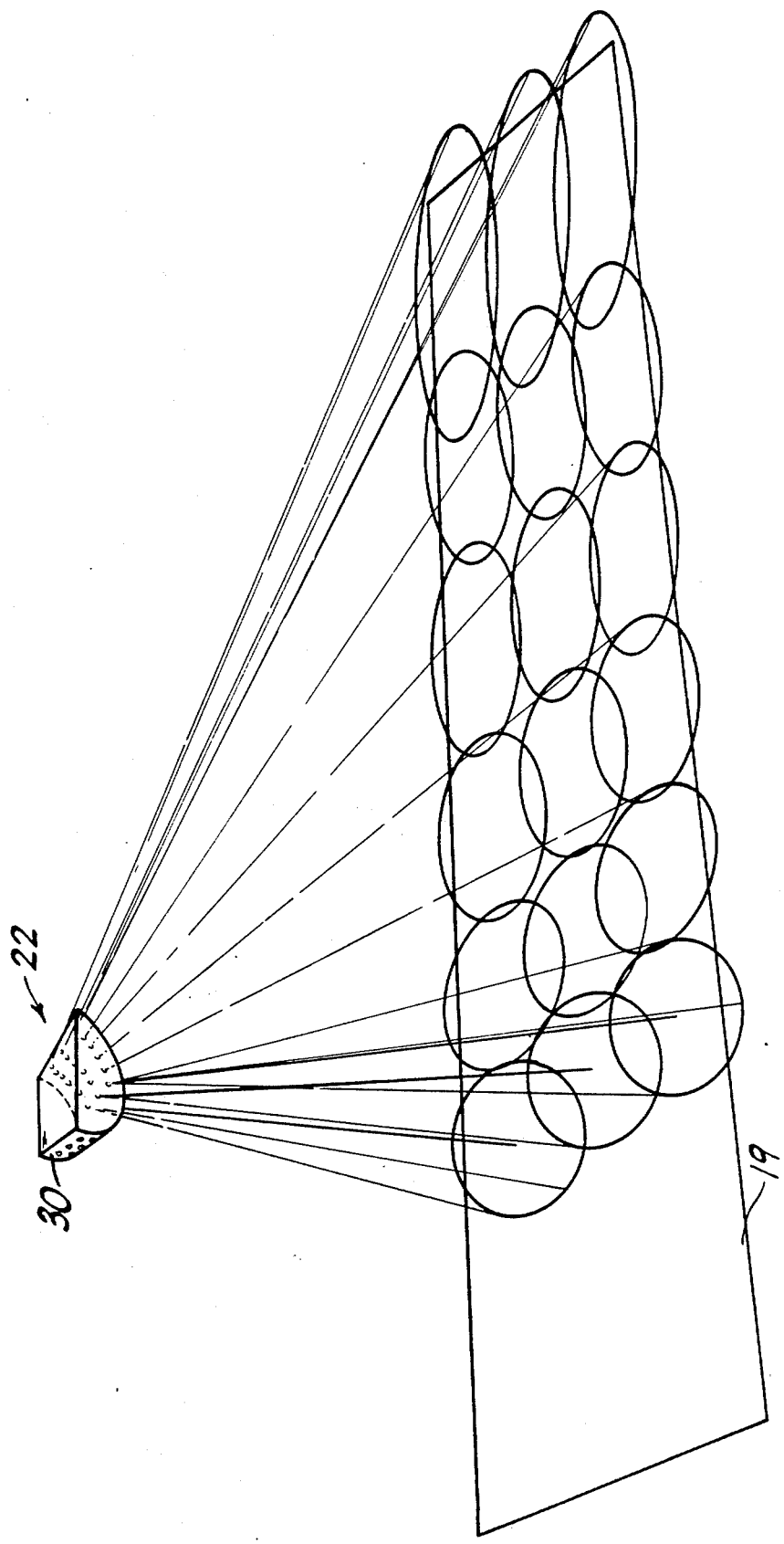
FIG. 2 is a partial illustration of the area illuminated by the infrared light source of FIG. 1.

This particular disposition of IR LED's 31 within the half cylindrical pod 30 at transceiver 22 provides an illumination area 19 which is partially illustrated in FIG. 2. It can be appreciated from FIG. 2 that the area 19 to be covered by the IR LED's 31 is a substantially rectangular area formed by the overlapping cones of illumination. The effective cones into which the IR LED's 31 radiate is also varied. IR LED's 31 with larger cone angles are used to cover areas closer to the IR LED's 31 and for areas further away, IR LED's 31 with the smaller cone angles are used. The number of IR LED's 31 pointing at an area further away can be increased to increase the power level incident on that area.

The area 19 illuminated by the transceiver 22 is a relatively small area and can cover only a small portion of the area in which the automatically guided vehicle 20 must travel. Accordingly, in a factory, warehouse, or other environment in which the present invention is utilized, a plurality of transceivers 22 must be ganged together to form a network.

Figure 8:
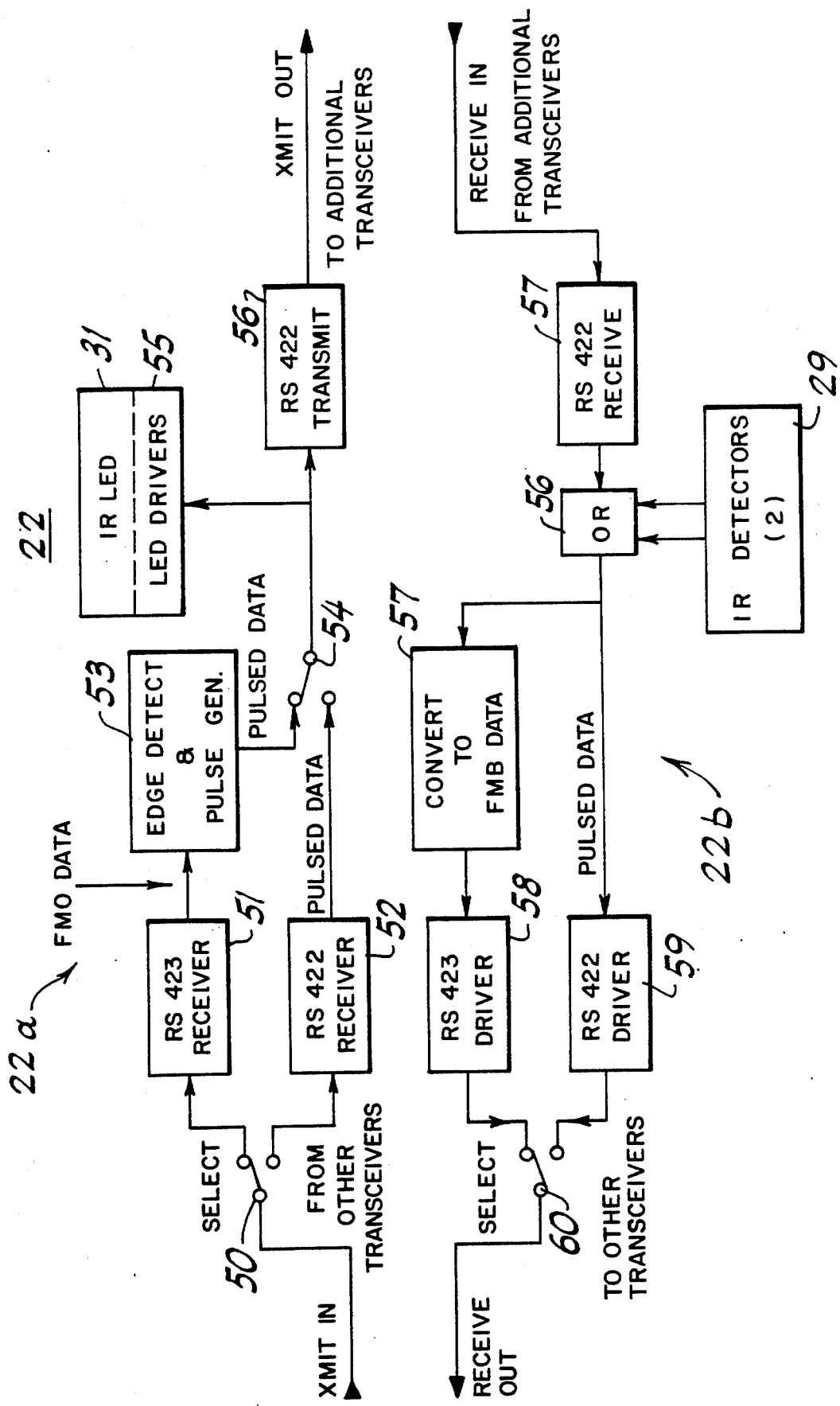
FIG. 8 is a block diagram of the transceiver electronics associated with the present invention.

Referring now to FIG. 8 a block diagram of the electronics associated with the transceiver 22 is provided. The transceiver 22 is comprised of a transmitting portion 22a and a receiving portion 22b.

An input signal designated XMIT IN is applied to the transmitting portion 22a from other transceivers, when the transceiver 22 is ganged together in a network. When the transceiver is the master transceiver the XMIT IN signal comes from a signal source such as a host computer. When the transceiver is part of an automatically guided vehicle system, the XMIT IN signal comes from a signal source on the automatically guided vehicle. The XMIT IN signal is applied to a switch 50 which selects whether the signal is applied to either a RS 423 receiver 51, if the transceiver is the master transceiver, or a RS 422 receiver 52, if the transceiver is not the master. The output of the host computer or vehicle signal source and thus the output of the RS 423 receiver 51 is frequency modulated output (FMO) data and the output of the RS 422 receiver 52 is pulsed data. The FMO data is applied to an edge detector and pulse generator 53 and is also converted to pulsed data. A switch 54 which cooperates with switch 50 selects one of the two pulsed data signals and applies it to LED drivers 55. The LED drivers 55 are connected to the IR LED's 31 described above and the pulsed data is converted to pulsed optical energy by the IR LED's. A RS 422 transmitter 56 may also be coupled to the switch 54 to send the selected pulsed data signal to additional transceivers when the transceivers are ganged together in a network.

The pulsed optical energy from the transceiver 21 on the automatically guided vehicle 20 is detected by the two photodiodes 29 of the receiving portion 22b of the transceiver 22. The photodiodes 29 convert the received optical energy into an electrical signal which is applied to an OR gate 156. The OR gate 156 is responsive to either the photodiodes 29 or a RECEIVE IN signal from other transceivers when the transceiver is ganged together in a network. The RECEIVE IN signal is applied to the OR gate via a RS 422 receiver 57. The output of OR gate 56 which is pulsed data is applied to a converter 57 which converts the pulsed data to FMO data and then it is applied to RS 423 driver 58. The output of the OR gate 156 is also applied to a RS 422 driver 59. A switch 60 selects whether the RECEIVE OUT signal comes from either the RS 423 driver 58 or the RS 422 driver 59. The RECEIVE OUT signal is then applied to a utilization device or other transceivers. Transceiver 21 is substantially identical to transceiver 22 except that it is not ganged together with additional transceivers.

All communications over the IR link formed by transceivers 21, 22 are preferably made using the SDLC/HDLC format. This protocol is a link level protocol which has been standardized by the International Standards Organization and defined in several documents published by this group. A modification to this protocol may be used to transmit the data over the IR link in a Manchester code. A conventional communications controller could be used in the system to control transceivers 21, 22, demodulate the Manchester encoding, and provide the format required for the SDLC protocol.

The transceivers 21, 22 can also be interfaced to a system computer which controls the automatically guided vehicles 20. This interface could include an Intel 8086 microprocessor at a fixed station coupled to an Ethernet network. The microprocessor could control the transmission and reception of data over the IR communications link. The system could be preferably set up as a half duplex, multipoint system with the 8086 microprocessor set up as the communications master. It could continuously poll the vehicles 20 to determine if a vehicle 20 has information to transmit. If so, the system transmitter could be turned off and the transceiver 22 could go into a receive mode. After reception of the vehicle message, the system could return to a polling mode where it is interrogating all vehicles 20 in sequence to determine if they have messages to send. During this time, if a message needs to be sent to a specific vehicle 20, the polling sequence could pause and the 8086 microprocessor could relay the specified message. In this manner, only one transmitter will be enabled at a time, and all other receivers would be in the receive mode.

The transceiver pods 30 can preferably be set in a pattern along the vehicle guide path to form a network. The pods can be connected with a cable for the information transfer and with a separate cable for power. The transceiver pods 30 can be either hard mounted in the ceiling or mounted on a pole and placed in a grid pattern.

Each of the vehicles 20 has a transceiver 21 similar to the fixed station transceiver 22 with the exception that the vehicle transceiver 21 is a single transceiver and not ganged as described for the fixed station. The vehicle transceiver 21 is of the same package and configuration as the fixed transceiver 22 and is mounted on the top of the vehicle 20. The transceivers 21 are normally in the receive only mode and respond or transmit messages only when requested to do so by the fixed station transceiver 22. The vehicle transmit/receive subsystem is preferably comprised of a transceiver 21, a Manchester encoder/decoder, and a HDLC/SDLC interface coupled to a 8086 microprocessor disposed on the vehicle 20. The messages received and transmitted by the vehicle transmit/receive system are used to control the vehicle 20 and to give status information.

When a message is to be sent to vehicle 20, each of the transceivers 22 transmit in parallel. Therefore, as the vehicle 20 moves around its predetermined pattern, different transceivers 22 will become the primary transmitter-receiver to the vehicle 20. However, this should be completely transparent to the vehicle 20 and no further control is required.

While the invention has been described in its preferred embodiments it is to be understood that the words which have been used are words of description rather than limitation and that changes may be made within the purview of the appended claims without departing from the true scope and spirit of the invention in its broader aspects.

We claim:

1. An infrared communications link for optically transmitting and receiving information to control an automatically guided vehicle in an electromagnetically hostile environment, said link comprising:

transmitting means disposed at a fixed location in said electromagnetically hostile environment for processing a signal into a pulsed data signal;

an infrared light source, disposed at said fixed location, having a plurality of infrared illumination devices disposed in a predetermined arc, and coupled to said transmitting means for converting the pulsed data signal into pulsed infrared energy, each of said infrared illumination devices for transmitting said pulsed infrared energy to a predetermined location in said hostile environment, said transmitting means including means for mounting said infrared illumination devices so that said predetermined locations overlap wherein said infrared illumination devices include a plurality of light emitting diodes disposed at predetermined locations on the outer surface of a half cylindrical pod;

infrared detecting means disposed on said vehicle for detecting the pulsed infrared energy of said infrared light source;

receiving means disposed on said vehicle and coupled to said infrared detecting means for recovering the pulsed data signal from the pulsed infrared energy;

an infrared light source and transmitting means disposed on said vehicle; and infrared detecting means and receiving means disposed at said fixed location, said infrared detecting means including a plurality of photodiodes also disposed on the outer surface of said half cylindrical pod.

2. An infrared communications link according to claim 1 wherein said photodiodes are covered by visible light filters.

3. An infrared communications link according to claim 2 wherein said half cylindrical pod includes a printed circuit board shielded by aluminum.

4. An infrared communications link according to claim 3 wherein said half cylindrical pod is coupled to an aluminum box having printed circuit boards disposed therein.

5. An infrared communications link according to claim 1 wherein said transmitting means include means for selectively receiving frequency modulated output data and pulsed data.

6. An infrared communications link according to claim 5 wherein said transmitting means includes means for converting the frequency modulated output data into pulsed data.

7. An infrared communications link according to claim 6 wherein the pulsed data is selectively applied to means for driving said infrared light source.

8. An infrared communications link according to claim 7 wherein said receiving means includes means for converting pulsed data to frequency modulated output data and means for selecting either the frequency modulated output data or pulsed data.

9. An infrared communications link according to claim 8 wherein said receiving means include a driver for the frequency modulated output data and a driver for the pulsed data.

10. An infrared communications link according to claim 9 wherein said transmitting means includes means for transmitting the signal applied to said infrared light source to receiving means disposed at another location.

11. An infrared communications link according to claim 10 wherein said receiving means includes means for receiving output signals from transmitting means disposed at another location.

12. An infrared communications link according to claim 11 wherein said infrared light source includes a plurality of light emitting diodes.

13. An infrared communications link according to claim 12 wherein said infrared detecting means includes a plurality of photodiodes.

14. An infrared communications link according to claim 13 wherein said transmitting means and said receiving means each includes means that can accommodate signals in both a RS 422 and a RS 423 format.

* * * * *